Figure 1:
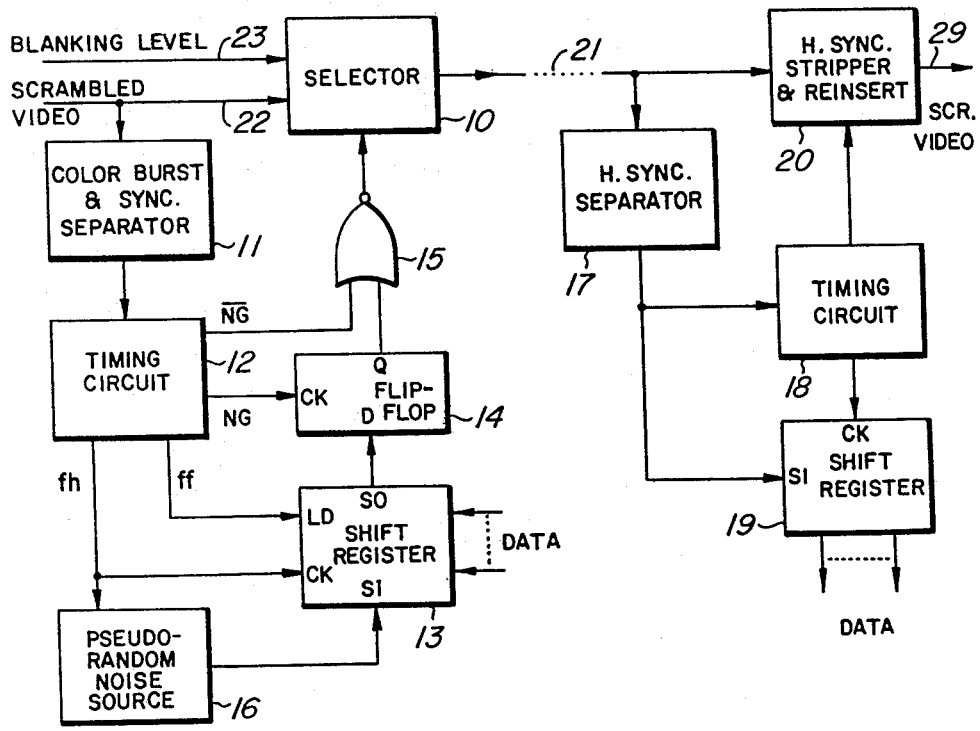

United States Patent [19]

Bond

[11] 4,396,946

[45] Aug. 2, 1983

[54] TRANSMISSION OF DATA WITH A VIDEO SIGNAL

[75] Inventor: John A. Bond, Ottawa, Canada

[73] Assignee: Northern Telecom Limited, Montreal, Canada

[21] Appl. No.: 246,877

[22] Filed: Mar. 23, 1981

[51] Int. Cl.³ .............................................. H04N 7/16
[52] U.S. Cl. .................................... 358/120; 358/122; 358/119; 358/123
[58] Field of Search ................ 358/119, 120, 122, 123

[56] References Cited

U.S. PATENT DOCUMENTS

| | | | |
|---|---|---|---|
| 3,313,880 | 4/1967 | Bass | 358/120 |
| 4,112,252 | 9/1978 | Liebler | 178/58 R |
| 4,222,068 | 9/1980 | Thompson | 358/120 |
| 4,338,628 | 7/1982 | Payne et al. | 358/122 |

Primary Examiner—S. C. Buczinski
Attorney, Agent, or Firm—R. John Haley

[57] ABSTRACT

The horizontal line synchronizing pulses of a video signal are selectively replaced with a video signal blanking level in dependence upon bits of data, whereby the data is transmitted with the video signal. Such data transmission is particularly applicable to a pay TV system in which the video signal is scrambled, because the selective absence of horizontal line synchronizing pulses enhances the video signal scrambling. In this case the data can comprise information relating to the scrambling of the video signal.

6 Claims, 2 Drawing Figures

TRANSMISSION OF DATA WITH A VIDEO SIGNAL

This invention relates to the transmission of data with a video signal.

It is an increasingly common requirement to be able to transmit data with a video signal, or as part of a television signal which includes a video signal. Such data may comprise information which is additional to the television signal itself, or in the case of a pay TV system in which the video signal (and possibly also the audio signal) is scrambled, it may comprise information which is needed by a subscriber of the pay TV sytem for unscrambling purposes.

Accordingly, various schemes have been devised to facilitate the transmission of data with a video or televison signal. For example, the data may be incorporated into the largely unused video signal lines in the vertical intervals of the video signal, or may be impressed subliminally into the video signal. Alternatively, the data may be added to the audio signal in the form of supersonic signalling tones and transmitted with the audio signal, or it may be modulated onto an additional carrier within the bandwith of the television signal channel. As a further alternative, data may be amplitude modulated onto the normally constant-amplitude frequency-modulated audio signal carrier.

An object of this invention is to provide a new method of and apparatus for transmitting data with a video signal, which is particularly, but not exclusively, applicable for use in pay TV systems.

According to this invention there is provided a method of transmitting binary data with a video signal, comprising modulating horizontal line synchronizing pulses of the video signal with said data, each bit (binary digit) of the data being used to selectively remove a horizontal line synchronizing pulse from the video signal, whereby each bit of said data is constituted by the presence or absence of a respective pulse. Such modulation is conveniently effected by selectively replacing horizontal line synchronizing pulses of the video signal with a video signal blanking level, in dependence upon said data.

The method of the invention is particularly applicable for use in a pay TV system, in which the video signal is scrambled and the data comprises information relating to the scrambling and is required by a subscriber of the system in order to effect unscrambling. In such a system the modulation of the horizontal line synchronizing pulses further enhances the scrambling of the video signal to produce horizontal tearing of the resultant picture produced without unscrambling, and the missing pulses can be readily regenerated in an unscrambler with which the subscriber must in any event be provided. The invention is further particularly applicable to a pay TV system and scrambling and unscrambling scheme of the type described and claimed in a copending patent application by J. A. Bond, Y. Li and L. J. Crane filed concurrently herewith and entitled "Scrambling and Unscrambling Video Signals in a Pay TV System", the entire disclosure of which is hereby incorporated herein by reference.

The invention also provides apparatus for transmitting data with a video signal which comprises video signal lines including line synchronizing pulses, comprising means for modulating said pulses with said data, said means for modulating said pulses comprising timing means for generating a timing signal during each line synchronizing pulse, gating means for gating said timing signal with each bit of said data to produce a control signal, and means responsive to said control signal to selectively replace each said pulse with a video signal blanking level.

The apparatus conveniently includes a shift register, means for recurrently loading said data into said shift register, and means for shifting said data from the shift register serially to said gating means at a bit rate corresponding to the repetition frequency of said line synchronizing pulses, and may further contain a noise source having an output coupled to a serial input of said shift register.

Figure 2:
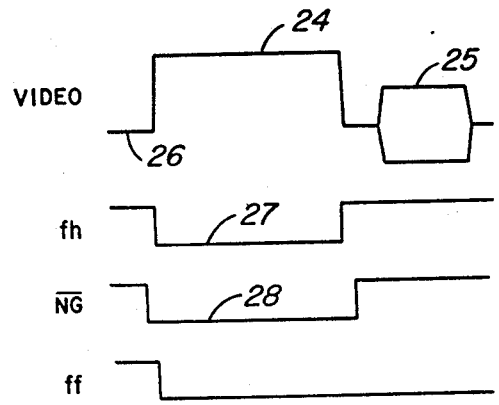

The invention will be further understood from the following description with reference to the accompanying drawings, in which:

FIG. 1 is a block diagram of an arrangement for transmitting data with a scrambled video signal in a pay TV system; and FIG. 2 is a timing diagram illustrating the timing of signals which occur in operation of the arrangement of FIG. 1.

Referring to FIG. 1, there is shown an arrangement for modulating data onto a scrambled video signal at a transmitter of a pay TV system, and for demodulating the data from the scrambled video signal at a subscriber station of the pay TV system. The data for example comprises information relating to the scrambling of a video signal to produce the scrambled video signal, which information is used at the subscriber station to enable unscrambling of the scrambled video signal. It is assumed here that the scrambled video signal is produced by replacement of each vertical interval of the video signal by dummy video signal lines, as described in the copending patent application by J. A. Bond et al. already referred to. Accordingly, the scrambled video signal here consists of a continuous stream of video signal lines, each of which includes normal horizontal line synchronizing information.

The modulating part of the arrangement shown in FIG. 1 consists of a selector 10, a color burst and sync. separator 11, a timing circuit 12, a shift register 13, a flip-flop 14, a NOR gate 15, and a pseudo-random noise source 16. The demodulating part of the arrangement consists of a horizontal sync. pulse separator 17, a timing circuit 18, a shift register 19, and a horizontal sync. pulse stripper and reinserter 20. The two parts are coupled by a transmission link 21, which may comprise a cable or broadcasting or satellite link. Other parts of the pay TV system, such as the scrambling and unscrambling apparatus, video signal transmitter and receiver, and analog-digital and digital-analog conversion circuitry which may be used to convert the video signal at the transmitter to a digital signal for ease of processing, are not shown or further described here because they form no part of the present invention itself.

The selector 10 is controlled by the output of the NOR gate 15 to couple either the scrambled video signal supplied on a line 22, or a video signal blanking level supplied on a line 23, to the transmission link 21. The scrambled video signal is also supplied to the color burst and sync. separator 11, which controls the timing circuit 12 to produce timing signals $\overline{NG}$ (and its inverse NG), fh, and ff which are shown in FIG. 2 in relation to the timing of the horizontal line synchronizing information of each video signal line of the scrambled video signal.

As shown in FIG. 2, the synchronizing information of each video signal line consists of a horizontal sync. pulse 24 and a color burst 25 which are superimposed on the video signal blanking level 26. The timing circuit 12, for example comprising a phase-locked loop synchronized by the color burst derived from the scrambled video signal by the separator 11, and frequency dividers, produces the signal fh with a logic 0 pulse 27 of 4.75μs duration substantially coincident with each horizontal sync. pulse 24, and thus at the repetition frequency of the video signal lines. The circuit 12 also produces the signal $\overline{\text{NG}}$ with a logic 0 pulse 28 of 5.45μs duration, which pulse embraces the entrie duration of the horizontal sync. pulse 24 but does not overlap the color burst 25. The circuit 12 also produces the signal ff at a lower frequency than the signals fh and $\overline{\text{NG}}$, with a transition having the timing shown. For example in the pay TV system the signal ff is produced at the field frequency of the video signal.

The signal ff is supplied to a load input LD of the shift register 13 to parallel-load data to be transmitted into the shift register. The data may comprise an arbitrary number of bits consistent with the relative frequencies of the signals ff and fh. The signal fh is supplied to a clock input CK of the shift register 13 to shift the data serially through the shift register to a serial output SO thereof. The signal fh is also used to clock the pseudo-random noise source 16 to supply a noise signal to a serial input SI of the shift register, so that the data is followed by noise. This is advantageous in the pay TV system in that it disguises the location of the data and enhances scrambling of the video signal throughout each field. However, the source 16 may be omitted if this feature is not desired.

The data appearing at the output SO of the shift register 13 is clocked from the D input to the Q output of the flip-flop 14 under the control of the signal $\overline{\text{NG}}$ supplied to the clock input CK of the flip-flop. The data at the Q output of the flip-flop is gated with the signal $\overline{\text{NG}}$ in the gate 15 to control the selector 10. When the signal $\overline{\text{NG}}$ is a logic 1, the output of the gate 15 is a logic 0 and the selector couples the line 22 to the transmission link 21. When the signal $\overline{\text{NG}}$ is a logic 0 the output of the gate 15 is dependent upon the data bit which is present at the output of the flip-flop 14. For a data bit 1, the gate 15 output is a logic 0 and the scrambled video signal is selected as before. For a data bit 0, the gate 15 output is a logic 1 so that the selector 10 couples the blanking level 26 on the line 23 to the transmission link 21, the horizontal sync. pulse 24 thereby being removed from the scrambled video signal on the link 21. Thus in the transmitted scrambled video signal, the data is transmitted one bit per video signal line (15734 bits/s), a horizontal sync. pulse 24 representing a data bit 1 and no horizontal sync. pulse representing a data bit 0.

In the demodulating part of the arrangement shown in FIG. 1, the horizontal sync. pulses which are present in the scrambled video signal are separated by the separator 17 and used to trigger a flywheel circuit in the timing circuit 18 to regenerate the horizontal line frequency. The timing circuit supplies the regenerated frequency to the stripper and reinserter 20, which strips the horizontal sync. pulses from the incoming scrambled video signal and reinserts a horizontal sync. pulse correctly in each horizontal line of the video signal to reproduce the scrambled video signal on an output line 29. The timing circit 18 also supplies a signal at the regenerated horizontal line frequency to a clock input CK of the shift register 19; to a serial input SI of which the separated horizontal sync. pulses from the separator 17 are applied as the data stream. The resultant demodulated data is derived from parallel outputs of the shift register 19.

It should be appreciated that the proper operation of the flywheel circuit in the timing circuit 18 relies on the presence of recurrent horizontal sync. pulses in the signal on the transmission link 21. In order to ensure this, a known form of data scrambler (not shown) can be provided, for example connected between the output of the gate 15 and the control input of the selector 10 and clocked by the signal fh, to break up long logic 0 and/or logic 1 sequences in the data stream, with a complementary descrambler (not shown) connected in the serial input to the shift register 19 and clocked simultaneously therewith. Alternatively, the arrangement could be modified to use a known zero suppression coding technique, the horizontal sync. pulses 24 being selectively blanked, transmitted with correct polarity, and transmitted with inverted polarity to provide the three transmission states required by such a technique.

Although the embodiment of the invention described above relates to a pay TV system in which the normal vertical intervals are replaced in the scrambled video signal, the invention is not limited thereto. The data can equally well be modulated onto a video signal, whether scrambled or not, which includes standard vertical intervals. In such a signal, of course, the equalization and serration pulses present in the first 9 lines of the vertical interval do not include horizontal sync. pulses 24, so that during these lines pulses of the signal fh would similarly need to be suppressed to avoid losing data from the shift register. This simply entails modifying the timing circuit 12. Alternatively, the timing of loading the data into the shift register 13, and the number of bits loaded, could be adjusted so that no data would be lost from the shift register during the first part of each vertical interval.

Furthermore, whilst the invention is particularly applicable to pay TV systems because the modulation of the horizontal sync. pulses effects an enhancement of the scrambling of the video signal, the invention is applicable to the transmission of data with any other, conventional, video signal. In the latter case it may be desired to avoid complete removal of horizontal sync. pulses from the transmitted video signal, in which case the data may be modulated onto the horizontal sync. pulses differently, for example using pulse duration, pulse position, or pulse amplitude modulation techniques.

As already described, the pseudo-random noise source 16 may be dispensed with. This source 16 is unnecessary in particular if the frequency ff is equal to the frequency fh divided by the number of bit positions of the shift register 13 (i.e. the number of bits which are simultaneously loaded into the shift register 13). Instead of the data being supplied and extracted in parallel at the frequency ff as described, it could of course alternatively be supplied directly to the flip-flop 14 and extracted directly from the separator 17 serially at the frequency fh.

Numerous other modifications, adaptations, and variations may be made without departing from the scope of the invention, which is defined in the claims.

I claim:

1. A method of transmitting binary data with a video signal, comprising modulating horizontal line synchronizing pulses of the video signal with said data, each bit (binary digit) of said data modulating a respective horizontal line synchronizing pulse and being constituted by the presence or absence of the respective horizontal line synchronizing pulse.

2. A method as claimed in claim 1 wherein said modulation is effected by selectively replacing horizontal line synchronizing pulses of the video signal with a video signal blanking level, in dependence upon said data.

3. A method as claimed in claim 1 or 2 wherein said video signal is a scrambled video signal and said data comprises information relating to the scrambling of said scrambled video signal, the method further comprising modulating with a noise signal horizontal line synchronizing pulses which are not required for modulation with said data.

4. Apparatus for transmitting binary data with a video signal which comprises video signal lines including line synchronizing pulses, comprising means for modulating said pulses with said data, each bit (binary data) of said data modulating a respective pulse, said means for modulating said pulses comprising timing means for generating a timing signal during each line synchronizing pulse, gating means for gating said timing signal with each bit of said data to produce a control signal, and means responsive to said control signal to selectively replace each said pulse with a video signal blanking level.

5. Apparatus as claimed in claim 4 and including a shift register, means for recurrently loading said data into said shift register, and means for shifting said data serially from the shift register to said gating means at a bit rate corresponding to the repetition frequency of said line synchronizing pulses.

6. Apparatus as claimed in claim 5 and including a noise source having an output coupled to a serial input of said shift register.

* * * * *